Patented Mar. 6, 1928.

1,661,278

UNITED STATES PATENT OFFICE.

BERNHART TROXLER, OF KENVIL, NEW JERSEY, ASSIGNOR TO HERCULES POWDER COMPANY, OF WILMINGTON, DELAWARE, A CORPORATION OF DELAWARE.

METHOD OF PREPARING PROGRESSIVE-BURNING SMOKELESS POWDER.

No Drawing.   Application filed November 16, 1926.   Serial No. 148,772.

My invention relates to an improved method for preparing progressive burning smokeless powder and more particularly to a method for coating and desirably impregnating smokeless powder grains with a deterrent material.

As is well known, in order to, for example, render possible a close control of the rate of burning of smokeless powder, to minimize flash and erosion and enable a high velocity of the projectile without high pressures, it has been customary to coat the powder grains with a deterrent material, explosive or nonexplosive, which will retard the burning of the grains. Such coating material is desirably caused to penetrate the grains more or less so that as the powder burns, the successively exposed surfaces contain gradually less and less of the deterrent material, thus causing the combustion of the grains to proceed with increasing speed.

In order to effect the coating of powder grains with deterrent material and to obtain the desired degree of penetration of such material numerous processes have been devised, for example, utilizing dinitrotoluene as the deterrent material, the powder grains coated with dinitrotoluene are subjected to heat while avoiding the presence of moisture so that the powder is treated in a dry state. According to another method the powder grains are coated with dinitrotoluene and subjected to the action of a hot aqueous vapor, as steam. By another method the powder grains are coated by treatment with a solution of dinitrotoluene in benzol, the benzol evaporated and penetration of the coating material obtained by a so-called "water-dry" treatment, which consists in immersing the coated grains in a bath of hot water for periods ranging from several hours to several days. By still another method, utilizing as the deterrent a mixture of dimethyldiphenylurea and dinitrotoluene, or dimethyldiphenylurea alone, the powder grains and deterrent are covered with water, after mixing heat is applied and finally the powder is subjected to the "water-dry" treatment.

The treatment of smokeless powder by methods heretofore known, while productive of desired results to a degree, has been open to a number of objections, chief among which are the length of time required to obtain the desired penetration, the time consumed by the "water-dry" treatment and the apparatus which it necessitates, as well as the necessity for freeing the powder from water after the treatment, clustering of the grains and non-uniform heating, caused by the use of steam, with attendant danger of incipient decomposition from local overheating.

Now in accordance with my invention, I may utilize as a deterrent dinitrotoluene, or other substance adaptable for use for the purpose, and subject the powder and deterrent to a definite temperature in the presence of a minimum quantity of water with the result that in a minimum of time and without other treatment the deterrent will be caused to desirably coat and penetrate the powder grains.

As an example of the carrying out of the process involving my invention, utilizing, for the purpose of this illustration, dinitrotoluene as the deterrent substance, from about 500–1400 pounds of powder grains, the amount depending upon the bulkiness and type of the powder, are placed in a drum and there is added thereto an amount of water only sufficient to moisten the surfaces of the powder grains. The amount of water added depends upon the fineness, or surface area and density of the powder. As illustrative of the amount of water added, I have found that with certain powder, the grains of which have large surface area, as much as 20% by weight of water is required to moisten the surfaces of the grains, while with other powders, the grains of which have little surface area, as little as 3% by weight of water is sufficient. The amount of water added to the powder does not in any sense cover the powder, it being added in quantity, depending upon the nature of the powder, only sufficient to moisten the surface of the grains, or as it were, cause a film of water over the surfaces of the grains.

To the powder is also added about 8% by weight of dinitrotoluene, though the amount of deterrent may vary within the range 1%–16% by weight depending upon the deterrent used.

The powder in the drum, after the addition of the water and dinitrotoluene, is heated, as by application of heat through the medium of a water bath, to a temperature of about 75° C. and agitated for about one and one-half hours, after which the coating and penetration of the powder grains will be found to have been completed.

The so-coated powder requires no further treatment except that it be air dried in order to remove the small amount of moisture which adheres to the grains. The drying operation may be made more effective and the time required minimized by opening the coating drum during, say, the last half hour of the treatment of the powder therein in order to let the water vapor escape.

It will be understood that my invention is not limited to the use of dinitrotoluene, as the deterrent substance, since many other substances as mononitronaphthalene, phenylacetanilide, dimethyldiphenylurea, or a mixture of dinitrotoluene and dimethyldiphenylurea heretofore used as deterrents, may be used with equal effect, though it will be noted that the temperatures at which the powder is treated, which will be within the range 55° C. to 110° C. in order to avoid injury to the powder, will necessarily be dictated by the choice of deterrent substance in order that the most appropriate temperature be used. For example, if mononitronaphthalene or a mixture 50% dinitrotoluene and 50% dimethyldiphenylurea be utilized instead of dinitrotoluene, the treatment should be carried out at temperatures of say 65° C. and 95° C. respectively.

The temperature is dependent upon the melting point of the deterrent used and the most appropriate temperature for any given deterrent will be obvious on selection of the deterrent.

The presence of the moisture on the powder in the amounts indicated tends to quicken the penetration of the powder grains by the deterrent and also enables the temperature of the powder grains to be raised to the desired point in a very short time due to the conductivity of the moisture.

By virtue of my invention not only are the powder grains desirably coated and penetrated by the deterrent substance, but as will be noted, the desired result is obtained with a very large saving in time and apparatus, since the use of excess water and the so-called "water-dry" treatment is eliminated, thus increasing the output capacity of a given apparatus and reducing the final drying operation. It will be noted further that non-uniform heating, as by steam, risk attendant upon elimination of solvents and other ingredients of the powder, as starch, soluble salts and the like, and clustering of the grains, all objectionable features of prior methods, are eliminated.

A further and highly advantageous result of my invention is that it enables the coating of double base smokeless powders with deterrent without injury to the powder such as results from any attempt to coat by processes involving the so called "water-dry" treatment. So-called double base smokeless powders, or those containing nitroglycerine, cannot be subjected to the water-dry treatment because the large amount of water required dissolves and/or displaces an appreciable quantity of nitroglycerine. By virtue of my invention, however, double base smokeless powder can be coated with a deterrent material because the time of treatment and quantity of water used are so small that no sensible amount of nitroglycerine is removed, particularly because in carrying out my invention, it is not necessary to drain off any water from the powder. Thus, in my process no condition arises under which nitroglycerine would be removed. Thus by virtue of my invention the production of coated, progressive burning double base smokeless powders, which has hitherto been impossible, is enabled.

Having now fully described my invention, what I claim and desire to protect by Letters Patent is:—

1. The method of coating smokeless powder grains with a deterrent substance which includes adding to a quantity of smokeless powder grains a quantity of water only sufficient to moisten the surfaces of the grains, adding a quantity of dinitrotoluene and heating until the dinitrotoluene has desirably coated the powder grains at a temperature of about 75° C.

2. The method of coating smokeless powder grains with a deterrent substance which includes adding to a quantity of smokeless powder grains a quantity of water only sufficient to moisten the surfaces of the grains, adding a deterrent substance and heating until the dinitrotoluene has desirably coated the powder grains at substantially a constant temperature within the range 55° C.–110° C.

3. The method of coating smokeless powder grains with a deterrent substance, which includes subjecting the powder grains, a deterrent substance and a quantity of water only sufficient to moisten the surfaces of the powder grains, to heat at a temperature not substantially above the melting point of the deterrent substance.

4. The method of coating smokeless powder grains with a deterrent substance, which includes subjecting the powder grains, a deterrent substance and a quantity of water only sufficient to moisten the surfaces of the powder grains to heat in the presence of air at a substantially constant temperature not substantially above the melting point of the deterrent substance.

5. The method of coating smokeless powder grains with a deterrent substance, which includes subjecting the powder grains, a deterrent substance and a quantity of water only sufficient to moisten the surfaces of the powder grains, in a container, to heat applied to the container externally and at a temperature not substantially above the melting point of the deterrent substance.

6. The method of coating smokeless powder grains with a deterrent substance, which includes subjecting the powder grains, a deterrent substance and a quantity of water only sufficient to moisten the surfaces of the powder grains to heat in the presence of air at a temperature not substantially above the melting point of the deterrent substance while agitating the powder grains.

In testimony of which invention, I have hereunto set my hand at Kenvil, N. J., on this 9th day of November, 1926.

BERNHART TROXLER.